United States Patent

Fujiwara et al.

[15] 3,666,893

[45] May 30, 1972

[54] MAGNETIC ERASER WITH HEAD WINDING AS PART OF OSCILLATOR CIRCUIT

[72] Inventors: Tatsuo Fujiwara, Tokyo; Hiromi Kusakabe, Yokohama, both of Japan

[73] Assignee: Tokyo Shibaura Electric Co., Ltd., Kawasaki-shi, Japan

[22] Filed: Sept. 22, 1970

[21] Appl. No.: 74,259

[30] Foreign Application Priority Data

| | | |
|---|---|---|
| Sept. 25, 1969 | Japan | 44/76103 |
| Nov. 12, 1969 | Japan | 44/90053 |
| Nov. 19, 1969 | Japan | 44/109195 |
| June 19, 1970 | Japan | 45/53129 |
| Oct. 3, 1969 | Japan | 44/94139 |

[52] U.S. Cl.......................179/100.2 D, 331/108 A, 331/176

[51] Int. Cl.......................G11b 5/02, H03b 5/12, H03b 5/04

[58] Field of Search.................179/100.2 D; 331/108 A, 176

[56] References Cited

UNITED STATES PATENTS 3,457,529 9/1969 Merdian, Jr. ..........................331/176

FOREIGN PATENTS OR APPLICATIONS 855,021 11/1960 Great Britain..................179/100.2 D

OTHER PUBLICATIONS

IBM Technical Disclosure Bulletin Vol. 8, No. 3 August 1965, page 359

*Primary Examiner*—J. Russell Goudeau
*Attorney*—Flynn & Frishauf

[57] ABSTRACT

A magnetic eraser for tape recorders wherein there are received in a single casing an erase head provided with an erase coil and an oscillator for supplying the erase head with erase current using the erase coil concurrently as an oscillation coil. The circuit includes at least two transistors and a plurality of resistance elements which are interconnected so as to be particularly suitable for construction by integrated circuit techniques, the circuit being connected to the erase coil at least by a pair of capacitors.

12 Claims, 8 Drawing Figures

MAGNETIC ERASER WITH HEAD WINDING AS PART OF OSCILLATOR CIRCUIT

BACKGROUND OF THE INVENTION

The present invention relates to a magnetic eraser and more particularly to a magnetic eraser having an erase oscillator contained in an erase head casing.

In recent years, there was widely accepted due to easy handling a tape recorder using a cassette or magazine containing a magnetic tape. Particularly, the cassette type device is used in not only reproducing information from a magnetic tape but also for recording it. Since the cassette is formed relatively compact and light, it is preferred that a tape recorder using such cassette be also formed compact and light.

Further, there is often incorporated a radio set in a tape recorder, for example in order to facilitate the recording of a radio program. A radio set, if formed of an integrated circuit, will not appreciably affect the size of a tape recorder when it is incorporated therein.

As is well known, a tape recorder comprises an erase head to erase information recorded on a magnetic tape which is disposed separately from a recording head and a reproducing head. Recording of information on a magnetic tape is effected by supplying signal current to the recording head. In this case, previously recorded information is erased by supplying erase current to the erase head. The erase current consists of alternating current having a frequency of 30 to 200 KHz so as to prevent the current from presenting beat interference with the signals to be recorded and also to obtain a suitable oscillation output.

With the conventional magnetic eraser for tape recorders, erase current from an erase oscillator is conducted to an erase head through a relatively long connection line. If, in case there is recorded a radio program on the magnetic tape of a tape recorder involving such type of eraser, the oscillating current from the erase oscillator has a distorted wave form, then there will be radiated an electromagnetic wave derived from harmonic components contained in the oscillating current outside of the oscillator, connection line and erase head, resulting in the occurrence of beat interference with incoming broadcast waves and in consequence the failure to receive a radio program. Countermeasures taken in the past to eliminate such difficulties consist in separately shielding the oscillator, connection line and erase head. However, adoption of such procedures alone does not fully attain the desired object. There is encountered a further disadvantage that the shielding of the connection line will lead to an increased line stray capacitance and in consequence a larger loss of erase current. The employment of the shield means as mentioned above is also expensive.

With the prior art tape recorder, output current from the oscillator is conducted, as mentioned above, to the erase head through the connection line, so that the eraser as a whole occupies an appreciably large space. If, therefore, the oscillator can be incorporated in the erase head casing, the eraser will occupy a much smaller space to thereby contribute to the miniaturization of a tape recorder and also to the reduction of spurious emissions which will obstruct the reception of a radio program.

The erase head is of relatively compact form like the recording or reproducing head and, if the oscillator is prepared from an integrated circuit, then it will be possible to incorporate it in a small casing. Generally, the oscillator requires an oscillation coil. If, however, the erase coil of the erase head can be concurrently used as such an oscillation coil, it will facilitate the integration of the oscillator, enabling power efficiency to be increased and the oscillator to be easily incorporated in the casing. Further, if the oscillator only requires a small number of capacitors having a small capacitance, it will be very convenient to the integration of the oscillator.

SUMMARY OF THE INVENTION

It is, accordingly, an object of the present invention to provide a magnetic eraser which is capable of contributing to the miniaturization of a tape recorder and reducing spurious emissions detrimental to reception of a radio program.

Another object of the invention is to provide an oscillator which can be easily integrated.

According to the invention, there is provided a magnetic eraser comprising an erase head provided with an erase coil, an oscillator for supplying the erase head with erase current using the erase coil concurrently as an oscillation coil, and a casing for containing the erase head and oscillator.

Further the present invention provides an oscillator for supplying the erase head with erase current which comprises first, second, and third resistance elements connected in series between the power supply terminals; first and second transistors of different conductivity types, the emitter of said first transistor being directly connected to the emitter of said second transistor, the collector of said first transistor being connected to one power supply terminal to which there is connected said first resistance element, the collector of said second transistor being connected to the other power supply terminal to which there is connected said second resistance element, the base of said first transistor being connected to the juncture of said first and a third resistance element and the base of said second transistor being connected to the juncture of said second and third resistance elements; a series resonance circuit comprised of the erase coil and a first capacitor connected between the juncture of the emitters of said first and second transistors and the collector of said second transistor; and a feedback capacitor connected between the juncture of said erase coil and first capacitor and a point intermediate the ends of said third resistance element.

DESCRIPTION OF THE PREFERRED EMBODIMENTS

Figure 1:
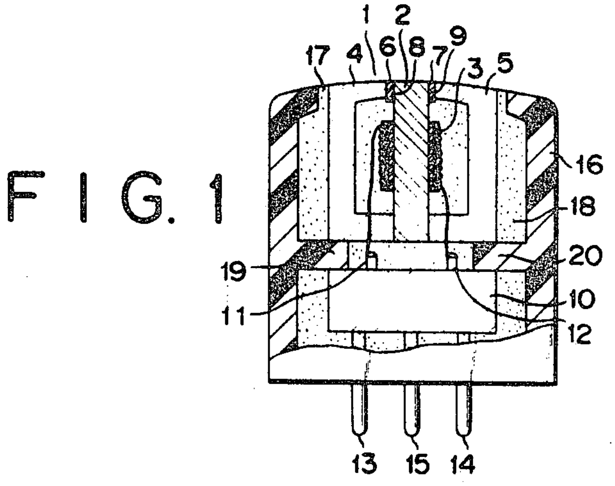
FIG. 1 is a plan view, partly in cross-section, of a magnetic eraser according to one embodiment of the present invention.

Referring to FIG. 1, reference numeral 1 represents an erase head having the known arrangement. The erase head comprises a central ferrite core 2 wound with a coil 3 and left and right ferrite cores 4 and 5 whose ends form gaps 6 and 7 respectively with the aforementioned central core 2. Into the spaced defined by the gaps 6 and 7 with the central core 2 are inserted non-magnetic spacers 8 and 9.

Reference numeral 10 denotes an oscillator formed on an integration circuit chip. From the oscillator are drawn out two inner terminals 11 and 12, to which there are connected both ends of the aforesaid coil 3. From the oscillator 10 are further led out three outer terminals 13, 14 and 15, of which the terminals 13 and 14 are connected to the power source for operating the oscillator. The remaining terminal 15 is used in supplying output from the oscillator 10 also to the recording head in the form of high frequency bias current.

In a casing 16 is housed the erase head 1 in such a manner that the front part where there are formed the gaps 6 and 7 is exposed to the outside through the window 17 of the casing 16. In the casing 16 is also received the oscillator so as to allow the outer terminals 13, 14 and 15 to project to the outside through apertures (not shown) bored at the rear part of the casing 16. The erase head 1 and oscillator 10 are fixed in place in the casing 16 by a potting material 18, such as epoxy resin. Numerals 19 and 20 are locating materials for the erase head 1 and oscillator 10 which may be formed integrally with the casing 16. For the reason given below, the casing 16 is preferred to consist of a suitable synthetic resin, for example, acrylic resin, instead of metal. After the erase head 1 is placed in the casing 16, the front parts of the erase head 1 and casing 16 have to be so lapped as to have an equal curvature. Accordingly, it is preferred that the casing 16 be made of substantially the same wear resistant material as that of the core constituting the erase head.

FIG. 2 illustrates an oscillator according to the present invention which can be easily integrated. Between the power supply terminals 13 and 14 are connected in turn in series first, second, third and fourth resistors 31, 32, 33 and 34. The first resistor 31 is connected to the positive power supply terminal 13 and the fourth resistor 34 to the negative power supply terminal 14 or ground potential. Also between the aforesaid power supply terminals 13 and 14 are connected in series first and second transistors 35 and 36 of different conductivity types. The collector of first transistor 35 of, for example, the NPN type, or the first collector is connected to the positive power supply terminal 13. The emitter of transistor 35, or first emitter is connected to the emitter of the second PNP type transistor 36, or a second emitter. The collector of transistor 36, or the second collector is connected to the negative power supply terminal 14. The base of transistor 35, or the first base is connected to the juncture of the first and second resistors 31 and 32. The base of transistor 36 or the second base is connected to the juncture of the third and fourth resistors 33 and 34. To the emitter of transistor 35 is connected one end of erase coil or oscillation coil 3 wound about the erase head 1. Between the other end of the coil 3 and the negative power supply terminal is connected a first capacitor 37 which constitutes a series resonance circuit with the coil 3. There is connected a second feedback capacitor 38 between the juncture of the oscillation coil 3 and a capacitor 37 and the juncture of the second and third resistors 32 and 33. From the juncture of the oscillation coil 3 and capacitor 37 is taken the terminal 15 through which to supply bias current to the recording head.

Figure 2A:
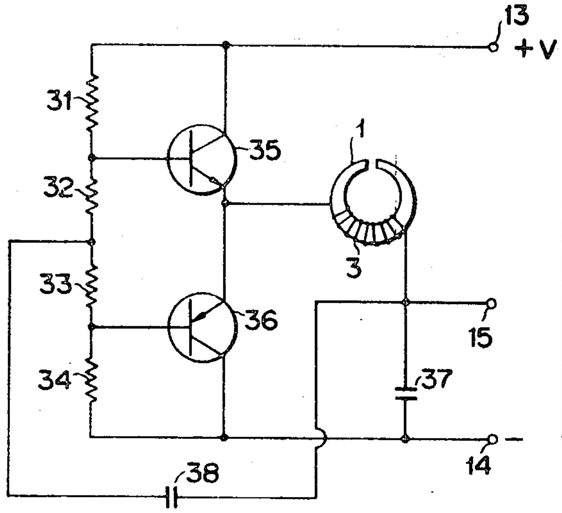
FIG. 2A illustrates an oscillator circuit according to the present invention.
Figure 2B:
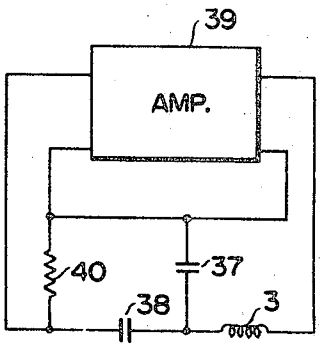
FIG. 2B is an equivalent circuit of the oscillator of FIG. 2A.

The oscillator of FIG. 2A may be equivalently represented as the circuit of FIG. 2B. Referring to FIG. 2B, output voltage from, for example, an emitter follower amplifier 39 in which output signals are in phase with input signals is supplied to a series resonance circuit consisting of the oscillator coil 3 and capacitor 37. The voltage across the capacitor 37 which lags 90° in phase at the resonant frequency of the series resonance circuit from the aforesaid output voltage from the amplifier 39 is supplied to a phase shifter or impedance converter. If the phase shifter is so designed as to cause a voltage whose frequency is determined by the series resonance circuit to be advanced substantially 90° in phase by a capacitor 38, then the voltage across the resistor 40 included in the phase shifter will assume substantially the same phase as the output voltage from the amplifier 39. Since the output is positively fed back to the input side in the same phase, there arises oscillations. It will be apparent that the transistors 35 and 36 shown in FIG. 2A constitute an emitter follower amplifier, respectively. The resistor 40 included in the phase shifter of FIG. 2B has a substantially equivalent value obtained by the parallel connection of a sum of the values of first and second resistors 31 and 32 of FIG. 2A, a sum of the values of third and fourth resistors 33 and 34 and a value of the input impedance of the transistor amplifier. Assuming that the first and fourth resistors respectively have a resistance of 1.5 KΩ and the second and third resistors respectively have a resistance of 1.1 KΩ, then the resistor 40 will have a resistance of about 1 KΩ.

The circuit of FIG. 2A is operated in the following manner. The transistors 35 and 36 are connected in the known single ended push-pull relationship. When the circuit is supplied with a source voltage of the indicated polarity, the transistor 35 is forward biased to be rendered in the on condition. At this time, the transistor 36 is back biased to be kept in the off condition. Upon conduction of the transistor 35, the first capacitor 37 of the series resonance circuit is charged. The capacitor 37 is finally charged up to a value arrived at by multiplying the source voltage by the $Q$ (quality factor) of the series resonance circuit. While the capacitor 37 is charged, positive variations in the voltage are supplied to the bases of transistors 35 and 36 through the second capacitor 38. Accordingly, the transistor 35 increases in base potential and is more accelerated toward conduction, thereby causing the transistor 36 to be far more back biased. This is the manner in which the capacitor 37 is charged up to the aforementioned level obtained by multiplying the source voltage by the $Q$ of the series resonance circuit. When the capacitor 37 is charged to such an extent, the base potential of the transistor 35 is brought back to its original value. Since the emitter potential is equal to the source voltage, the first transistor 35 is back biased to be rendered off. On the other hand, the transistor 36 has its emitter potential raised higher than its base potential so as to be forward biased to an on condition. Accordingly, the voltage of capacitor 37 is discharged through the transistor 36. At the time of the discharge, negative voltage variations in the capacitor 37 are supplied to the bases of first and second transistors 35 and 36, causing the transistor 35 to be more back biased, so that the second transistor 36 is reduced in base potential and accelerated toward conduction. The voltage across the capacitor 37 thus charged by conduction of transistor 37 is discharged. The oscillator tends to start oscillation with a resonance frequency determined by the oscillation coil 3 and capacitor 37, so that the capacitor 37 is charged backward up to a value arrived at by multiplying a voltage substantially the same as the source voltage by the $Q$ of the resonance circuit. At this stage, voltage variations in the capacitor 37 are retarded to prevent feedback by the capacitor 38. Since the emitters of transistors 35 and 36 are brought to substantially ground potential, the first transistor 35 goes to the on condition and the second transistor 36 turns off, as at the initial stage.

As is apparent from the foregoing description, since the voltage across the series resonance circuit connected to the emitters of both transistors is in phase with the voltage fed back to the bases of both transistors through the feedback capacitor 38 the oscillator continues oscillation. Since the erase coil 3 and capacitor 37 constitute a series resonance circuit, it will be readily understood that the current passing through the erase coil is sinusoidal current having a frequency determined, as is well known, by the inductance of erase coil 3 and the capacitance of capacitor 37.

The oscillator of FIG. 2A utilizes the oscillation coil also as the erase coil and only requires two capacitors, so that it is well adapted to be integrated. Further, if there is used an oscillation coil having a large inductance the capacitor 37 of the series resonance circuit may have a relatively small capacitance, and the capacitor 38 of the phase shifter is only required to have a capacitance about one-tenth that of the first capacitor 37. Accordingly, it will be easy to incorporate other circuit elements than the oscillation coil of FIG. 2A in a single hybrid integrated circuit chip. For example, the first capacitor 37 is only required to have a capacitance of 4,700 P.F. and the second capacitor 38 a capacitance of about 470 P.F. It is, of course, possible to provide the first and second capacitors 37 and 38 separately and incorporate the resistors and transistors in a monolithic integrated circuit chip. In this case, the capacitors 37 and 38 are compact due to a relatively small capacitance being required. Accordingly, it is easy to place the capacitors 37 and 38 in an erase head casing together with the monolithic integrated chip. By way of comparison, reference is made to, for example, a Colpitts oscillator. For practical application, this oscillator requires at least three capacitors each of which has a large capacitance. Since these capacitors collectively occupy a volume scores of times larger than the capacitors in the oscillator of the present invention, it is next to impossible to receive the Colpitts oscillator in the erase head casing. On the other hand, a Hartley oscillator requires an oscillation coil to be tapped. Moreover, since the construction of an erase head becomes complicated, there is a tendency for a D.C. component to pass through the oscillation coil, resulting in increased erasing noises. Elimination of the D.C. component would render the Hartley circuit all the more complicated. Therefore, neither of the aforementioned two types of oscillators meets the object of the present invention.

FIG. 1 only illustrates an integrated circuit, that is, a hybrid integrated circuit chip including capacitors. It will be apparent, however, that in the case of the monolithic integrated circuit, there are placed separate capacitors in the casing.

As described above, the oscillator of FIG. 2A involves the oscillation coil or erase coil. However, the $Q$ of the coil is desired to be larger than 20. The reason is that a low $Q$ will result in a low oscillation efficiency and the occurrence of oscillation current containing a harmonic components. Distorted oscillation current will impart erase noises to a recording tape and gives rise to increased beat interference with a radio program.

Elevation of the $Q$ of oscillation coil or erase coil is effected by applying a ferrite core of high magnetic permeability, that is, least subject to magnetic loss, interposing a non-magnetic spacer in the head gap and forming the gap to a relatively small width, for example, 50 to 200 microns and using a coil having a small D.C. resistance.

If the erase head is formed into a double gap type illustrated in FIG. 1 in which, the gaps have the same width the erase efficiency will increase as is well known, and further the beat interference with a radio program will be reduced since magnetic fluxes pass through both gaps with the same magnitude, but in opposite directions, and they offset each other at a point remote from the gaps. Of course, a single gap type erase head is well adapted for practical application. If the erase head casing 16 is made of metal, the magnetic flux from the erase head will generate an eddy current in the metal casing, leading to a reduced oscillation efficiency or equivalently the decreased $Q$ of the oscillation coil. To increase the $Q$, therefore, it is preferred that the casing be made of plastic material.

The oscillator of FIG. 2A comprises a first and second transistor of different conductivity types. If in case such oscillator is integrated, there are formed on a semiconductor substrate of, for example, P type conductivity, a first NPN type transistor 35 and a second lateral PNP type transistor 36, then the PNP transistor 36 will tend to decrease in a current amplification factor, presenting difficulties in displaying the same electrical properties as the NPN type transistor. However, such difficulties will be eliminated by the circuit of FIG. 3.

Figure 3:
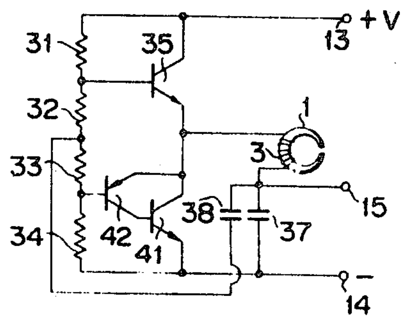
FIG. 3 is a modification of the oscillator of FIG. 2A.

The circuit of FIG. 3 uses a second NPN type transistor 41 instead of PNP type transistor 36 of FIG. 2A. The transistor 41 is designed to have substantially the same current amplification factor as the first NPN type transistor 35. The collector of transistor 41 is connected to the emitter of transistor 35 and the emitter of transistor 41 to the negative power supply terminal 14. There is further provided a third PNP type transistor 42, whose emitter is connected to the collector of transistor 41, whose collector is connected to the base of transistor 41 and whose base is connected to the juncture of the third and fourth resistors 33 and 34. The second and third transistors 41 and 42 constitute a Darlington circuit. The transistor 42 is so designed that its current amplification factor $h_{FE}$ will attain a value of substantially 1. Accordingly, the Darlington circuit consisting of the transistors 41 and 42 is substantially equivalent to the PNP type transistor which has the same electrical properties as the first NPN type transistor 35 except for the type of conductivity.

With the oscillator circuit shown in FIG. 3, while the first capacitor 37 is charged, the transistor 42 remains non-conducting as in the circuit of FIG. 2A and consequently the transistor 41 is also in an off condition. While the capacitor 37 is discharged, the transistor 42 and in consequence to the transistor 41 are conducting. It will be understood that in this case the third PNP type transistor 42 is only intended to reverse the phase of the feedback input signal, because its current amplification factor $h_{FE}$ substantially approximates to 1. The same parts of FIG. 3 as those of FIG. 2A are denoted by the same numerals.

Figure 4:
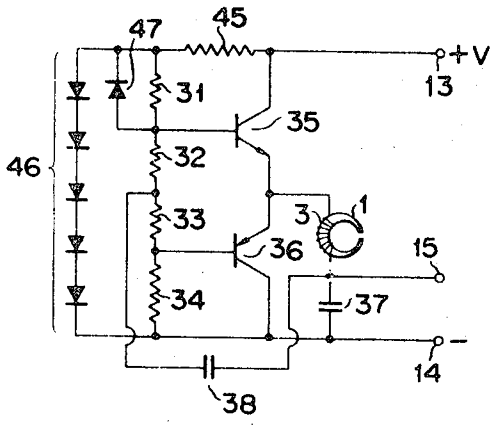
FIG. 4 is another modification of the oscillator of FIG. 2A.

In a tape recorder, the oscillation current of the erase oscillator is supplied, during recording, to the recording head in the form of bias current. If, in this case, the amplitude of oscillation current is caused to vary due to fluctuation in the source voltage, then the recording AC bias voltage will depart from an optimum value, resulting in the occurrence of undesirable events such as the deterioration of frequency characteristics, fluctuation in recording level and increased distortion of the wave form of oscillated current. Therefore, it is preferred that the erase oscillator be so arranged as to prevent the oscillation current from varying in amplitude even in case there occurs fluctuation in the source voltage. FIG. 4 illustrates an embodiment of the present invention which can attain such an object. The same parts of FIG. 4 are indicated by the same numerals.

Referring to FIG. 4, there is connected a fifth resistor 45 between the first resistor 31 and the collector of transistor 35. Between the juncture of first resistor 31 and fifth resistor 45 and the negative power supply terminal 14 is connected a diode stack 46 consisting of five diodes, for example, connected in series in a forward direction with respect to the source polarity. Further across the first resistor 31 is connected a diode 47 in an opposite direction to the source polarity. If each of the diodes constituting the diode stack 46 has a forward knee voltage of about 0.7 volt, then the overall knee voltage will be about 3.5 volts, so that the voltage at the juncture of the first and fifth resistors 31 and 45 will be constantly maintained at about 3.5 volts independently of the source voltage.

As mentioned above, the capacitor 37 of the series resonance circuit is charged up to a level arrived at by multiplying the source voltage by the $Q$ of the resonance circuit. When the charge voltage of capacitor 37 fully increases, the base voltage of transistor 35 tends to rise 3.5 volts. At this time, however, the diode 47 connected across the first resistor 31 is conducted to limit the base voltage of transistor 35 to about 4.2 volts max., a sum of the aforesaid 3.5 volts and the knee voltage of diode 47. This means that regardless of rise in the source voltage, the positive clip level of the amplifier does not exceed about 3.5 volts, a voltage arrived at by subtracting from the aforesaid 4.2 volts a voltage of about 0.7 volt across the base-emitter diode of transistor 35. Accordingly, even when the source voltage rises, the amplitude of the output from the emitter of transistors 35 and 36 and in consequence the level of oscillation current is maintained constant. When the source voltage rises, the charged voltage of capacitor 37 is clipped on the emitter side of transistors 35 and 36. However, the current passing through the series resonance circuit is sinusoidal current having a fixed frequency. From the recording bias terminal 15, therefore, is drawn out sinusoidal bias current having a fixed level. It will be apparent that when the diode stack 46 consists of a larger number of diodes the knee voltage of the stack and in consequence the level of oscillation current will rise, whereas if said stack 46 is formed of a smaller number of diodes the level of oscillation current will decrease.

The magnetic eraser of FIG. 1 is fixed in place in the casing 16 by synthetic resin 18 used as a potting material. As is well known, when the head core is mechanically deformed, the magnetic properties will deteriorate. If the oscillator has a combination oscillation coil and erase coil, the $Q$ of the oscillation coil will be reduced to decrease oscillation efficiency, causing in the worst case the failure of oscillation. As is well known, some kinds of synthetic resins such as epoxy resin, for example, will contract upon temperature drop. If such resins are used as a potting material in a magnetic eraser arranged as shown in FIG. 1, then there should be taken countermeasures to prevent the failure of oscillation possibly caused by the decreased $Q$ of the oscillation coil due to the stress imposed on the erase head by temperature drop. The embodiments of FIGS. 5 and 6 can attain such object.

Figure 6:
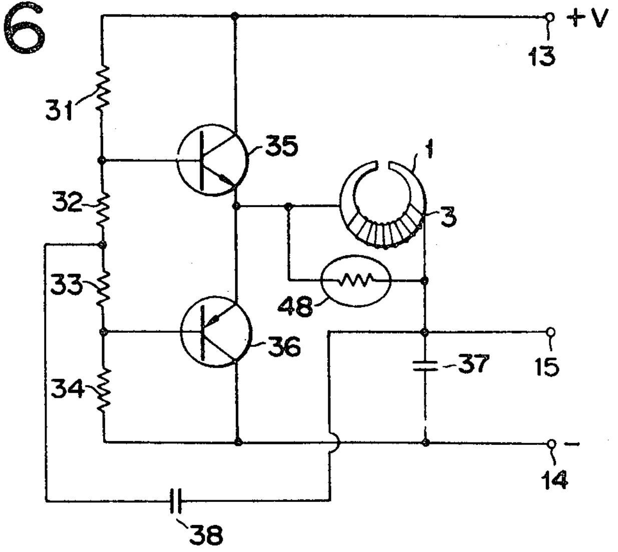
FIG. 6 illustrates the oscillator of the magnetic eraser of FIG. 5.

FIG. 6 illustrates an oscillator like that of FIG. 1. The oscillator of FIG. 6 involves a thermal sensitive resistant element or thermistor 48 disposed parallel with the erase coil or oscillation coil 3. As is well known, the thermistor 48 will increase in resistance upon temperature drop.

Figure 5:
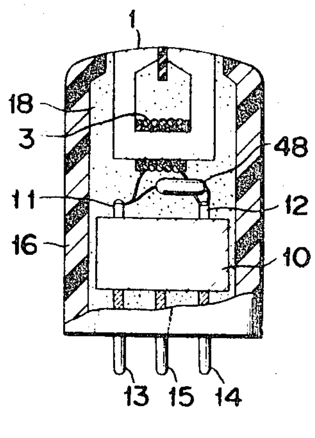
FIG. 5 is a plan view, partly broken away, of a magnetic eraser according to another embodiment of the invention.

Referring to FIG. 5, the thermistor 48 is embedded parallel with the oscillation coil 3 in the synthetic resin potting material inserted into the eraser casing 16.

The embodiment of FIG. 5 uses a single gap type erase head 1. It is known that parallel connection of a resistor with the erase coil 3 reduces its quality factor. Therefore, the $Q$ of erase coil 3 is so selected as to permit the oscillator of FIG. 6 to perform oscillation at normal or higher temperatures. Upon temperature drop, the thermistor 48 embedded in the synthetic resin potting material 18 quickly detects the temperature of the potting material 18 and presents an increased resistance. When temperature falls, the head core is subject to stress and the $Q$ of erase coil tends to decrease. However, the increased resistance of the thermistor 48 positioned in parallel with the erase coil 3 compensates the fall of $Q$, enabling the oscillator to carry out oscillation even when temperature decreases.

Figure 7:
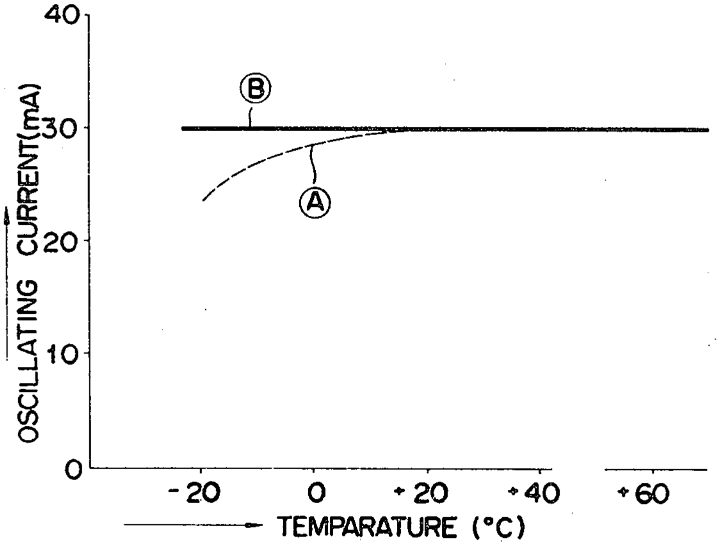
FIG. 7 is a graph showing the relationship of the oscillation current versus temperature of the magnetic eraser of FIG. 5.

FIG. 7 shows the relationship of the oscillation current versus temperature of the oscillator of FIG. 6. The curve A illustrates the properties of the oscillator which is not provided with a temperature compensation element. A temperature drop reduces the $Q$ of oscillation coil and in consequence oscillation current. The curve B shows the properties of the oscillator of FIG. 6, namely, that the oscillation current is kept constant regardless of temperature drop.

In the embodiment of FIG. 5, the thermistor 48 is disposed separately from the oscillator 10 of the integrated circuit. However the thermistor 48 may be incorporated in a hybrid integrated circuit.

As mentioned above, the magnetic eraser of the present invention has an erase head and oscillator received in the same casing, thus reducing the space it occupies and prominently decreasing beat interference with a radio program. It will be apparent that the beat interference can be far more reduced by placing the eraser apart from the antenna of a radio set incorporated in a tape recorder or taking other adequate measures.

What we claim is:

1. A magnetic eraser comprising an erase head provided with an erase coil; an oscillator for supplying the erase head with erase current and in which the erase coil is concurrently used as an oscillation coil; and a casing for receiving the erase head and oscillator, said oscillator comprising:

a plurality of resistance elements connected in series across a power source;

first and second transistors of different conductivity types each having a collector, emitter and base, the emitter of said first transistor being connected to the emitter of said second transistor, the collector of said first transistor being connected to one terminal of said power source to which there is connected a first of said resistance elements, the collector of said second transistor being connected to the other terminal of said power source to which there is connected a second of said resistance elements, a third of said resistance elements being connected in series between said first and second resistance elements, the base of said first transistor being connected to the juncture of said first and third resistance elements and the base of said second transistor being connected to the juncture of said second and third resistance elements;

a first capacitor, one end of which is connected to said collector of said second transistor and the other end of which is connected through said erase coil to said emitter of said first transistor, thereby constituting a series resonance circuit with said erase coil; and a second feedback capacitor connected between the juncture of said erase coil and first capacitor and a point intermediate the ends of said third resistance element.

2. The magnetic eraser according to claim 1 wherein said oscillator is formed on a hybrid integrated circuit chip.

3. The magnetic eraser according to claim 1 wherein the elements of said oscillator other than said first and second capacitors are formed on a monolithic integrated circuit chip.

4. The magnetic eraser according to claim 1 including a recording bias current terminal coupled from the juncture of said erase coil and first capacitor.

5. The magnetic eraser according to claim 1 wherein said oscillator comprises:

a fourth resistance element connected between said first resistance element and one terminal of said power source;

a diode stack connected between the juncture of said first and fourth resistance elements and said other terminal of said power source to which there is connected said second resistance element, said diode stack including a plurality of series connected diodes connected in the forward direction with respect to the polarity of said power source; and an additional diode connected across said first resistance element in an opposite direction to the polarity of said power source.

6. The magnetic eraser according to claim 1 wherein said resistance elements are individual resistors.

7. The magnetic eraser according to claim 6 wherein said third resistance element comprises the series combination of a pair of resistors, said intermediate point being the juncture point of said pair of resistors.

8. The magnetic eraser according to claim 1 which further comprises a thermistor connected in parallel with said erase coil.

9. The magnetic eraser according to claim 8 wherein said thermistor and oscillator are embedded in a potting compound.

10. A magnetic eraser comprising an erase head provided with an erase coil; an oscillator for supplying the erase head with erase current and in which the erase coil is concurrently used as an oscillation coil; and a casing for receiving the erase head and oscillator, said oscillator comprising:

a plurality of resistance elements connected across a power source;

first, second and third transistors each having a collector, emitter and base, said third transistor having a different conductivity type from that of the first and second transistors, the collector of said first transistor being connected to one terminal of said power source to which there is connected a first of said resistance elements, the emitter of said second transistor being connected to the other terminal of said power source to which there is connected a second of said resistance elements, the emitter of said first transistor being connected to the collector of said second transistor and the emitter of said third transistor, the collector of said third transistor being connected to the base of said second transistor, a third of said resistance elements being connected in series between said first and second resistance elements, the base of said first transistor being connected to the juncture of said first and third resistance elements, and the base of said third transistor being connected to the juncture of said second and third resistance elements;

a first capacitor, one end of which is connected to the emitter of said second transistor and the other end of which is connected through said erase coil to the emitter of said first transistor, thereby constituting a series resonance circuit with said erase coil; and a second feedback capacitor connected between the juncture of said erase coil and first capacitor and a point intermediate the ends of said third resistance element.

11. The magnetic eraser according to claim 10 wherein said oscillator comprises:

a fourth resistance element connected between said first resistance element and one terminal of said power source;

a diode stack connected between the juncture of said first and fourth resistance elements and said other terminal of said power source to which there is connected said second resistance element, said diode stack including a plurality of series connected diodes connected in the forward direction with respect to the polarity of said power source; and an additional diode connected across said first resistance element in an opposite direction to the polarity of said power source.

12. The magnetic eraser according to claim 11 wherein said resistance elements are individual resistors.

* * * * *